US008552983B2

(12) United States Patent
Chiu (10) Patent No.: US 8,552,983 B2
(45) Date of Patent: Oct. 8, 2013

(54) INTELLIGENT ROBOTIC INTERFACE INPUT DEVICE

(76) Inventor: Hsien-Hsiang Chiu, Branchton (CA)

(*) Notice: Subject to any disclaimer, the term of this patent is extended or adjusted under 35 U.S.C. 154(b) by 177 days.

(21) Appl. No.: 12/311,239

(22) PCT Filed: Jul. 8, 2008

(86) PCT No.: PCT/CA2008/001256
§ 371 (c)(1),
(2), (4) Date: Mar. 23, 2009

(87) PCT Pub. No.: WO2009/006735
PCT Pub. Date: Jan. 15, 2009

(65) Prior Publication Data
US 2010/0103106 A1    Apr. 29, 2010

(30) Foreign Application Priority Data

Jul. 11, 2007   (CA) .................................... 2591808

(51) Int. Cl.
| G06F 3/033 | (2013.01) |
| G10L 21/00 | (2013.01) |
| G10L 13/08 | (2013.01) |
| H04N 7/18 | (2006.01) |
| G08B 6/00 | (2006.01) |

(52) U.S. Cl.
USPC ............................ 345/166; 704/275; 348/135

(58) Field of Classification Search
None
See application file for complete search history.

(56) References Cited

U.S. PATENT DOCUMENTS

| 4,988,981 | A  * | 1/1991  | Zimmerman et al. ........ 345/158 |
| 5,594,469 | A  * | 1/1997  | Freeman et al. .............. 345/158 |
| 5,754,225 | A  * | 5/1998  | Naganuma .................... 348/155 |
| 5,936,610 | A  * | 8/1999  | Endo ............................. 345/157 |
| 6,002,808 | A  * | 12/1999 | Freeman ....................... 382/288 |
| 6,452,585 | B1 * | 9/2002  | Horton et al. ................. 345/158 |
| 6,498,628 | B2 * | 12/2002 | Iwamura ....................... 348/734 |
| 6,690,357 | B1 * | 2/2004  | Dunton et al. ................ 345/158 |
| 7,038,709 | B1 * | 5/2006  | Verghese ...................... 348/169 |
| RE40,880  | E  * | 8/2009  | DuFaux ........................ 345/168 |
| 7,599,520 | B2 * | 10/2009 | Dempski et al. ............. 382/103 |
| 7,843,429 | B2 * | 11/2010 | Pryor ............................ 345/158 |
| 7,911,447 | B2 * | 3/2011  | Kouno .......................... 345/158 |
| 2008/0005703 | A1 * | 1/2008 | Radivojevic et al. ......... 715/863 |

* cited by examiner

*Primary Examiner* — K. Wong
(74) *Attorney, Agent, or Firm* — The Law Firm of Andrea Hence Evans, LLC (57) ABSTRACT

An intelligent object tracking and gestures sensing input device is operative to translate hand gestures of a user into data and commands for operating a computer or various machines. It is provided with video web cameras video vision camera, sensors. A logical vision sensor program in the device measures movements of the user's hand gesture into X, Y and Z dimension definitions. It defines a working space spaced therefrom into virtual space mouse zone, space keyboard zone, and hang sign language zone. It automatically translates the change of coordinates of the user's hand in puzzle cell positions in the virtual working space into the data and commands. Objects having enhance symbols, colors, shape, and illuminated lights are attachable on the user's hand to provide precision input.

39 Claims, 8 Drawing Sheets

INTELLIGENT ROBOTIC INTERFACE INPUT DEVICE

BACKGROUND OF THE INVENTION

1. Field of the Invention

This invention relates to an intelligent object tracking and gestures sensing input device which is operative remotely for automatically sensing gestures from a move about human for providing input commands to a variety of apparatuses such a computer or various electrically operated machines for performing numerous selected operations. The input device is operative as a universal virtual space mouse, virtual space keyboard, or virtual remote controller to transform and track hand gestures and finger actions of a user into data commands for operating the computer or machines with ease. It may also operate in response to voice commands or electrical coding such as Morse code to instruct a computer or machine to perform a variety of operations.

2. Background Art

Nowadays, mobile telephones are becoming ever smaller in size and it is very difficult to operate their key boards with fingers. Often it is necessary to employ the sharp point of a pen for the operation. Furthermore, computers are designed solely for use by people without any physical disability. For people with physical disabilities in movement, eyesight, hearing or speech, they are unable to operate the computer, or can only operate it with great difficulty. Moreover, many modern household appliances such as electronic devices, television, stereo equipment, text translation devices, air conditioner, and cable signal processing devices are provided with hand-operated remote control units. The plurality of remote control units render them difficult to operate particularly with numerous auxiliary devices that are connected to a television set such that it is often necessary to operate several remote control units of all the auxiliary devices as well as that of the television set for simply turning on the latter. It is time consuming and skill demanding for people to learn initially the operations of these various remote control units. More often, their operations are so complex and difficult to remember that they must be re-learned and practiced repeatedly so as to acquire the basic proficiency in operating them.

SUMMARY OF THE INVENTION

The above problems are obviated by the present invention of an intelligent object tracking and gestures sensing input device.

The input device is equipped with a central control computer unit, video vision camera sensor, web cameras, a plurality of sensors, and logical software program capable of processing the data from these equipments for providing various desired operations of the machine being controlled. It utilizes the video vision camera sensor, and web cameras for automatically scanning a selected work space for tracking an object to provide dimension data to the central control computer for defining a virtual space mouse zone, virtual space keyboard zone, or a virtual hand sign language zone located between the work space and the object, namely a user of the input device, such that the user may enter text and operation commands of the machine through the input device by merely using various hand gestures. The video vision camera sensor is also movable to track the user and observes and recognizes the movements of the user's hand gestures and to correlate the movements with defined puzzle-cell positions established in the virtual working space zones. The device will automatically translate the user's hand gestures and will correlate them on the puzzle-cell positions in the work space which are mapped with software mapping lists for converting the hand gestures into meaningful computer controlled operations. The device is thus capable of executing the cursor movements on the computer display such as Up, Down, Left, Right, Left Click, Right Click, and entering text, characters or alphabets such as a, A, b, B, c, C, Backspace, Ctrl, Shift, Del, and Enter key etc., from hand gestures of the user.

The present input device is also able to provide reading of hand sign languages from observing the user's hands and/or body gestures according to a pre-programmed listing of hand sign language gesture patterns and grammars, and thus it can recognize words and/or commands that the user wishes to enter into a computer or machine. It is able to enter symbolic character writing such as a Chinese character, and to draw a picture into the computer by observing the user's hand gesture movements in making such character or picture.

The input device can be trained and taught to track a specific object moving in the virtual working zone by recognizing its shape, symbol and/or colors. Optional wireless sensors may be embedded or attached on the object being tracked so as to enhance the reliability of vision reading of the object by the device and also to meet the user's special requirements especially for those having physical disabilities and requiring special assistance to operate a computer or machine.

The virtual space mouse and space keyboard defined by the input device are customized with puzzle-cell positions. Each puzzle-cell position of the space zone allows the user to re-program the standard working zone position of the space mouse. The space keyboard is customized with certain key re-arrangements which may be set up for a puzzle cell position of the working space zone to represent certain meaning of text and commands. The customizable virtual space mouse and keyboard facilitate time saving for the user to make entry to a computer easily and quickly for both text and commands that are commonly used for operating the computer or machine.

The input device can be used to control all appliances in a home. A user can just use hand gestures to operate a television set with the present device built-in so as to perform the common remote control operations of Channel Up or Down, Volume Up or Down, and Power ON or OFF for the television set. Furthermore, the present device can be incorporated in a home appliance automation system by installing it in the home so that it can constantly observe and response to the home owner's hand gestures, and with the additional incorporation of a speech recognition software program, it can respond also to voice commands to operate electrical devices or for turning individual lighting equipment ON or OFF. Also, it can be customized to recognize movements made with a particular wood stick so that the latter can instantly be used as a universal remote controller of all appliances to function as a magic stick remote controller. Therefore, the device of the present invention can simplify the operation of all the remote controllers in a home by merely requiring hand gesture commands from the user; and people assisted by the device can have more powerful access of all electrical devices in the home in a dynamic manner; and furthermore, it can help people with physical limitations to operate electrical devices readily and easily.

The input device of the present invention is also equipped with a microphone, sound sensors, and speech recognition software program such that it can also respond to the user's voice commands, and it is equipped with a speaker for providing an audio output of text and articles being read. It is provided with an optional audio output which is operative to indicate each input character and commands from the user so as to serve as a feedback to confirm whether the input or command from the user has been entered correctly by the user.

The input device of the present invention includes a motor vibrate silent-reading module comprising a micro controller to serve as a programmed brain. This module has a 2-section vibration surface used to distinguish long or short signal coding so that it can read Morse code text coding. Two seashell shaped spring coils are attached on two motors which can spin to generate long signal and short signal. These motors can be either step motors, servo motors, or DC motors, and they are operative with one motor rotating to generate short spin vibrations and the other motor rotating long spin vibrations so as to generate Morse code and the standard text coding for the users, especially for a blind or deaf person to read the information silently. The device includes a smart phone or wireless receiver connected to a micro controller in a second module which is controlled by a computer program from the device through wireless technology protocols such as Wi-fi 802.11, Bluetooth, or Wimax, IP and cell phone channels. Thus, the present device can command the motor vibrate module to operate its motor spins for generating the long short vibrate signals to represent Morse code and/or standard text code.

The input device of the present invention can facilitate the ease of use of a computer or a machine for either normal people or people with physical disabilities. It can also eliminate the difficulty of having to operate the small keys in the keyboard of mobile telephones and portable data processing devices. Also, it can be incorporated into a home to obviate the difficulty of having to use a plurality of remote control units for operating an electrical appliance. The input device can therefore benefit people by saving time, space, material, and money, and it can increase the dynamic use of computers and machines so that they may be also used effectively and easily by handicapped people.

DETAILED DESCRIPTION OF THE PREFERRED EMBODIMENTS

Figure 1:
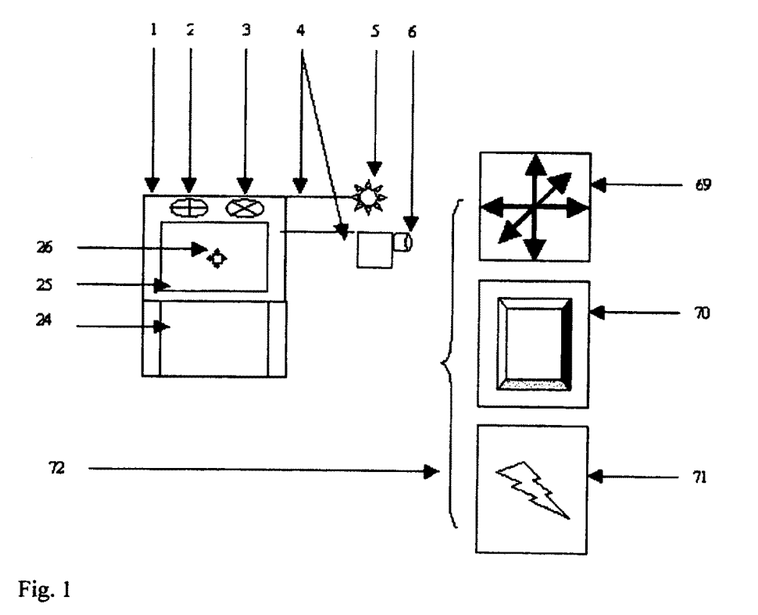
FIG. 1 is a schematic diagram showing the input device of the present invention operating for scanning virtually and automatically a working space zone, virtual space mouse zone, virtual space keyboard zone, and hand-sign language zone in which a user may be located.

With reference to the drawings, as shown in FIG. 1, the intelligent object tracking and gestures sensing input device 1 of the present invention is located at a distance 72 from the user located in a working space. The input device 1 can operate automatically for detecting the presence of the user and tracking the user with its sensor 5. It is equipped with a video web camera 2, a web camera 3, and a video vision camera sensor 6, which operate in combination for recording a scaled image of the user so as to measure the width and height dimensions of the user and the data to a central control computer to calibrate automatically the distance 72 between it and the working space so as to establish a virtual space mouse zone 69, a virtual space keyboard zone 70 and a hand-sign language zone 71 at the working space as fully explained in the following description. The input device can interact selectively with a user located in one selected individual zone or with all three zones simultaneously. The connection 4 of the sensor 5 with the video vision camera 6 can be provided by either direct wire connection or wireless connection.

Figure 2:
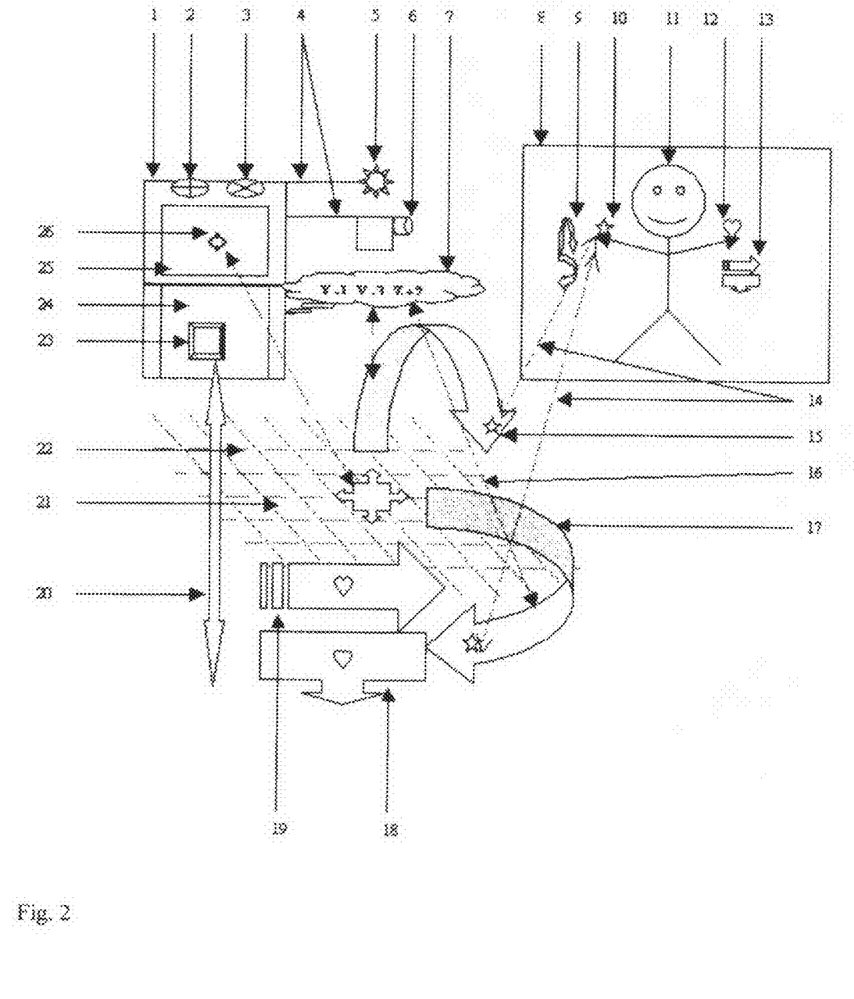
FIG. 2 is a schematic diagram showing in detail the operation of the input device of the present invention with the user located in the virtual space mouse zone.

FIG. 2 illustrates the operation of the device 1 with only the virtual space mouse zone. The web camera 2 operates to track the X and Y dimensions readings to obtain the width of the user, while the web camera 3 operates to track the Z dimension reading to obtain the height of the user. The input device 1 is provided with a logical vision tracking program 7 which analyses the direction of movement of the user for tracking the user to watch for hand gestures. When the user moves the right hand 10 in the up or down direction, the logical vision tracking program 7 will change the X surface direction 15 and the Y surface direction 17 to move the value entry in the computer up or down, or left or right correspondingly. Thus, when the logical vision tracking program 7 in having received the changing dimensions X and Y will match these changing dimensions with the value in the calibrated Y line 21 and the value in the calibrated X line 22 of the virtual space position. A position translate program 20 provided in the device 1 will automatically translate these values into updated new X and Y positions for the cursor 26 on the computer monitor 25 to move the latter to a correct position.

To change the pages on the computer monitor 25, the user 11 would move the left hand in a punch out gesture towards the device 1 to represent the clicking action of the computer mouse and then moves the right hand in a circular motion to execute the page change. The logical vision tracking program 7 will correspondingly change the value of the X surface direction 15 and the value in the Y surface direction 17, and will confirm the value in the Z surface direction 18. The position translate program 20 will convert the new tracking position's X Y value and Z value into mapping action values to confirm the mouse clicking operation and to move the page on the computer monitor up, down, left, or right according to the user's right hand gesture movement.

To make a Double Click mouse operation, the user 11 would make a left hand punch out gesture towards the device 1 with a back and forth action 13 three times. The logical vision tracking program 7 will respond by changing the value of the Z surface direction 19 three times so that the position translate program 20 will convert the three z, z, z values into the mapping value as a right click mouse operation for the computer.

Various shapes and/or colors may be drawn on the computer by having wireless sensors, LED lights, or laser beam lights located on or imbedded in the fingers portion of a glove worn by the user, or directly carried in the user's fingers. The visual vision camera of the device 1 watches the X, Y and Z dimension values simultaneously, and the logical vision tracking program 7 can be trained to track very small movements and gestures of the user's fingers. It locks onto each individual specific shape, size, color, wireless sensors, and lights that are incorporated on the object's fingers. For example, a variety of star shape objects of vision tracking symbols 10 may be worn on the user's right hand fingers, and a variety of heart shape objects of vision tracking symbols may also be worn on the user's left hand fingers. The additional objects enable the user to mimic the normal physical mouse operations, as described above, more accurately in one hand, in the virtual space mouse zone, so that the device can precisely track the X, Y, and Z dimensions of the gesture movements to perform the desired virtual space mouse functions more readily.

Furthermore, the device1 may selectively be equipped with only one video camera, or only one web camera to perform the virtual space mouse functions. The logical vision tracking program can intercept the video frames, and can compare several video frames to establish the X, Y, and Z dimensions of the tracking value.

Figure 3:
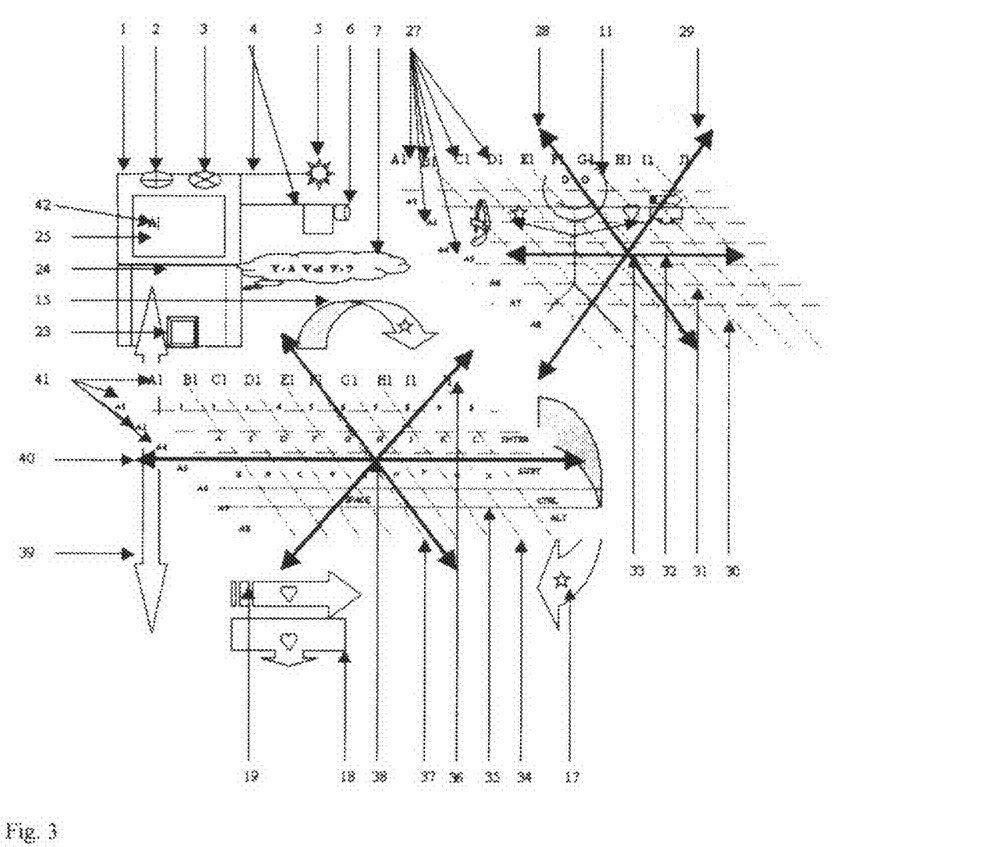
FIG. 3 is a schematic diagram showing detail of the operation of the input device of the present invention with the user located in the virtual space keyboard zone.

FIG. 3 shows the detail of the operation of the device of the present invention with the virtual space keyboard zone. The video vision camera 6, vision sensor 5, and web camera 2 of the device 1 cooperate to track the X and Y dimension readings. The web camera 3 is used to track the Z dimension reading. The logical vision tracking program 7 provides a trained computer vision for constantly watching for the user's hand gestures and also for tracking the movement of the user. The sensor 5 detects the presence of the user, and the video web camera measures the user's height and width so that the computer can calibrate and determine automatically the size of the working space 8. The system will then virtually establish a dimension axis G-point 33 in the working space. The G-point 33 represents the center point of the whole working space 8 relative to a 3D level user working space 8 having an X dimension surface 32, Y dimension surface 29, and Z dimension surface 28. The space positions X, Y, and Z of the user's hand gesture will be based on the relative distances of these positions to the G-point 33. For example, if the coordinates of the start point of the hand position is at (X0, Y0 and Z0), changes in the distances of the hand position from the G-point 33 will be represented by either a plus or minus value. The center of the virtual space keyboard will be initialized at the point (X0, Y0 and Z0). The virtual space keyboard zone is calibrated into puzzle cell positions 27. Similar to the standard keyboard keys arrangement, the first right side puzzle cell position key of the G-point 33 represents the "H" key, and the first left side of the G-point 33 represents the "G" key. The device 1 recognizes the physical arrangement of all the positions of the keys in the keyboard and the alignment angles relative to the keyboard key lines arrangement. The device 1 establishes the relation between the mimic physical keyboard alignment angles and arranges the puzzle cell positions in the keyboard style as a virtual space keyboard. When the right hand of the user is moved to a position in the puzzle cell position representing the "H" key, and, in the meantime, moves the left hand in a punch motion towards the device 1, the logical vision tracking program 7 residing in the device 1 will process the information to accept the change in the Z surface direction 18. The Z dimension value 36 will have a value of −1 in the logical vision tracking program 7 to confirm the change in the X surface direction 15 of the selected key position. The X dimension value 40 will be added a value of 1 by the logical vision tracking program 7 relative to the vision G-point center 38. Thus, the logical vision tracking program 7 in receiving the changed values in the X and Y dimensions, will automatically translate the new position translate program 39 into a keyboard mapping listing. The new X tracking value 40 will be matched on the "H" key and the character "H" 42 will be displayed on the monitor 25.

The "Shift" key or any special function key operation may be achieved with a two-step Z value selection method. In this operation, the user 11 first places the left hand to the puzzle-cell position on the relative "Shift" key space position and makes a punch motion towards the device 1. The logical vision tracking program 7 residing in the device 1 will accept the Z surface direction 18. The Z dimension value 36 will be added a value of −1, and its position translate program 39 will translate the action into a keyboard mapping listing for a "Shift" key position. The user will then hold the left hand position and then moves the right hand to the "A" key position while moving the left hand in a punch out motion towards the device 1 to confirm the key selection. The logical vision tracking program in the device 1 will accept the Z surface direction 18, and the Z dimension value 36 will be added a value of −1 to become −2. The position translate program 39 will translate the action into a keyboard mapping listing as a double "Shift" key action so as to confirm the key selection and the new X surface direction 15 and the new Y surface direction 17. The X dimension value 40 will add a value of −5 relative to the distance from the vision G-Point 38 center. The Y dimension value 17 will add 0 value relative to the distance from the vision G-point 38 center, and the position translate program 39 will translate it into a keyboard mapping listing of a puzzle space representing the capital "A" key. Similarly, the 2 steps method can be employed to perform the operation of the "Ctrl". "Alt", Special function keys, "!", "@", "#", "$", "%", "^", "&", "*", "(", ")". "{". "}". "|". "−". "+" etc., keys.

The selection of the "Backspace", "Enter", "Arrow Up", "Arrow Down", "Arrow Left", "Arrow Right", "ESC", "Del", "Home", "End". "PgUp", "PgDn", "Pause", "Prt Sc" keys only requires the user to punch towards the device 1 one time. The position translate program 39 is able to distinguish between those special function keys and to perform it as a one time key selection.

Figure 4:
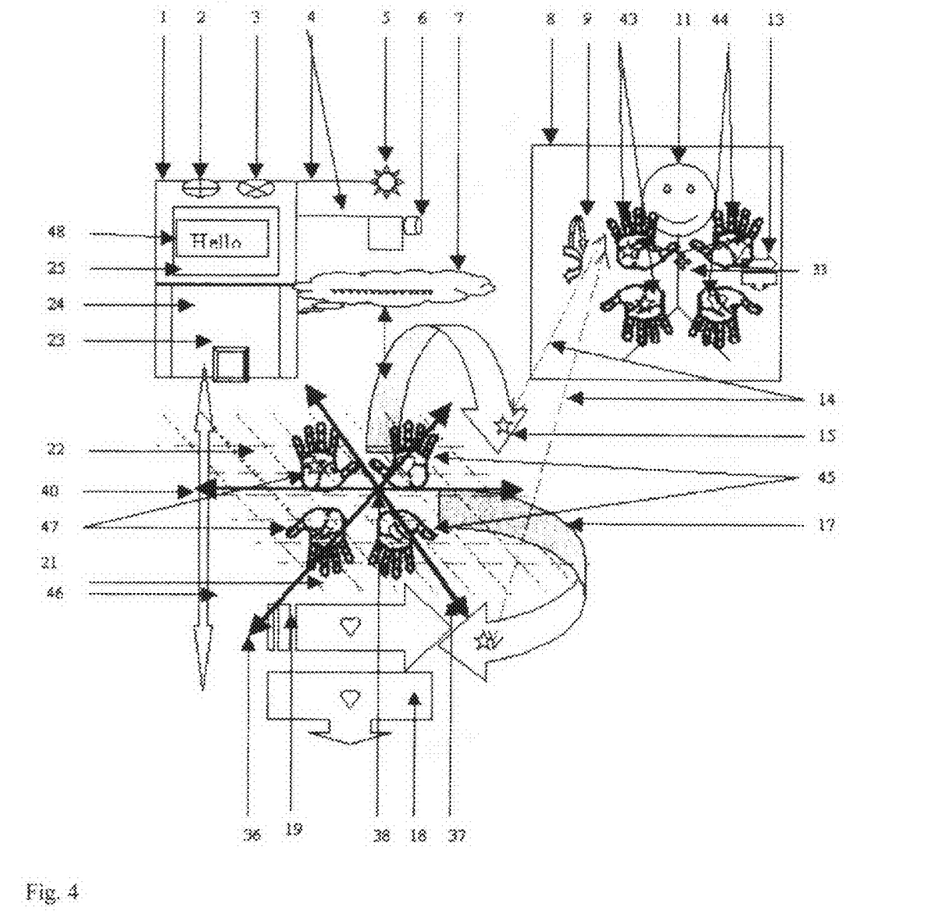
FIG. 4 is a schematic diagram showing in detail the operation of the input device of the present invention with the user located in the hand-sign language zone.

FIG. 4 shows the detail operation of the hand-sign language zone. The video vision camera 6, vision sensor 5, and the web camera 2 of the device 1 cooperate to provide the X, Y dimension tracking readings. The web camera 3 operates to provide the Z dimension tracking reading. The sensor 5 in the device detects the presence of the user and the video web camera measures the user's height and width for automatically calibrating the size of the virtual working space 8. The device 1 will then virtually establish the G-point 33 representing the axis or center of the whole virtual working space 8. The logical vision tracking program 7 operates the device to provide a computer vision for constantly watching for the user's hand gestures and to track the movements of the user. The logical vision tracking program 7 processes received data for recognizing gestures from both hands of the user. The computer's vision program responds to the received data will track the positions 43 and 44 of both the left hand fingers and the right hand fingers respectively in the following manner. The logical vision tracking program obtains the values of the X, Y, and Z coordinates of the user's fingers and sets the X, Y, and Z space positions of the fingers relative to the G-point 33. The device's logical vision tracking program 7 processes and confirms the X, Y, and Z position with values of 1 for the fingers of both hands relative to the distance from the vision G-point center 38. It will establish the position and motion of the fingers to represent the standard hand-sign language gestures. When the user requires to rotate the hands to represent a turn or flip motion for the hand sign language gestures, the logical vision tracking program 7 in the device 1 will process the data of the changing positions of the fingers in both hands for varying both forger's X surface direction 15, the value of the X dimension 40, the Y surface direction 17, the value of the Y dimension 37, the Z surface direction 18, and the value of the Z dimension 36 and it will add new values to these dimension values relative to the distance from the vision G-point center 38. When the user rotates the right hand with the fingers gestures 43 pointing down as well as rotating the left hand with the fingers gestures 44 pointing down, the main unit's logical program will obtain the values 45 and 47 of the X, Y, and Z positions respectively of the user. If the user holds both hands together, the logical vision tracking program provides an edge of hand gesture position to derive the 360 degree of the X, Y, and Z dimension values and will add new values relative to the distances to the robotic interface input device's vision G-point center 38 for each edge points of the hand sign gesture. The 360 degree of the gestures of the X, Y and Z dimension values are arranged into a series of tracking values. The hand sign 360 degree XYZ position translate program 46 will match the series of tracking values to establish the specific hand-sign words the user wishes to make. Thus, when the user makes a "Hello" hand-sign gesture, the device 1 will receive the "Hello" word 48 and will display the word accordingly on the monitor 25.

To increase the precision of the hand sign recognition, the user 11 may carry or wear on the fingers specific objects of various shapes, colors, and/or wireless sensors/LED lights, or laser beam lights. The device's video visual camera can watch the user's gesture in the X, Y, and Z dimension values all at the same time. The logical vision tracking program 7 can process data from the tracking of very small finger gesture movements by locking on each individual specific object's shape, size, colors, embedded wireless sensors/LED lights, or laser beam lights.

The logical vision tracking program 7 in the device 1 is capable of processing the recognition of a special object such as the sharp point of a pen. Therefore, the user may hold the sharp point of a pen by pointing it to the device of the present invention and then moving the pen in air in the motion of writing a word or drawing a picture. The device 1 watches each video frame and marks the X, Y and Z values of the pen's sharp point, and then updates these values to a monitor or a drawing software. The series of frame signals of the X, Y and Z values will be transformed into a meaningful symbolic character writing or drawing to display on the monitor of a computer.

Figure 5A:
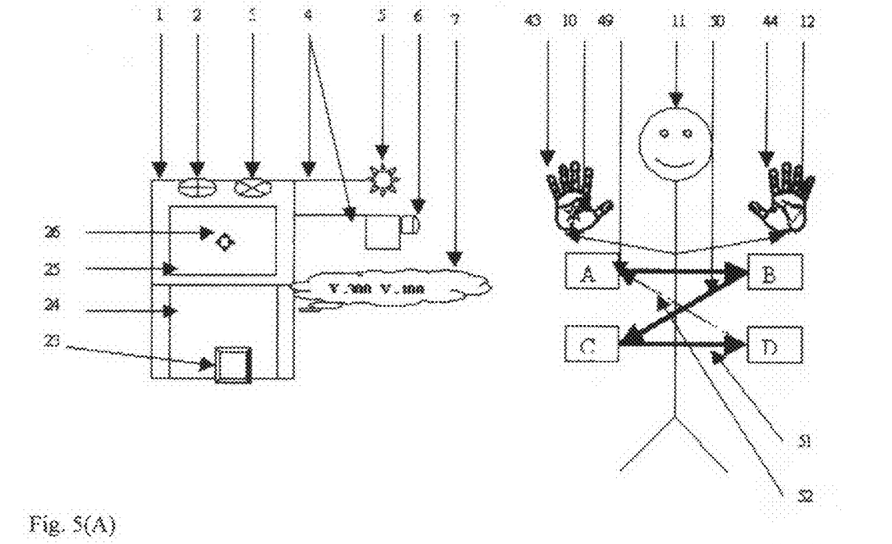
FIG. 5(A) is a schematic diagram showing Part 1 of the operation of entering the initializing sequence steps into the input device for avoiding interaction with unintentional or unauthorized commands.

FIG. 5(A) illustrates the initializing sequence of steps of the device for recognizing and resolving inputs of unintentional or unauthorized commands. The sequence steps are as follows:

1. In order to inform the device that the user wishes to start the vision input data or command, the user must first initialized sequence gesture actions to wake up the device from the sleeping mode for accepting the user's command.
2. The user moves the hands or makes body gestures sequences so that the device can recognize that the user intents to enter data or commands. In receiving the hand gesture actions from the user, the device accepts the XYZ values to determine the user is located steadily in a position facing it in the virtual working space zone. Thereafter the movement of the user's hands will establish the X Y dimension range in the working space such that the device is able to determine that it is not someone or something just temporarily passing through the virtual working space zone. The device can also determine that the user has the intelligent or knowledge to use the vision commands and the intent to enter data or commands.
3. By watching the hand or body gesture sequence actions, the device can measure the user's proper working space and can set and adjust the working space size, the 360 degree edge of the coordinates X and Y of the working space, the proper Z dimension working space range according to the user's initial hand location around the space length range.
4. Preset personal unique gesture action sequences are provided in the device to determine whether the user is an authorized user. For example, the user can initiate an initializing sequential operation by moving the right hand from a point A 49 to a point B at 50, to a point C at 51, to a point D at 52, and back to the point A at 49, and then moving the left hand in a reverse sequence. The device's logical vision tracking program 7 and position translate program will recognize the sequential actions and will match them with the pre-set authority gesture action sequences to confirm that the user is an authorized user. It will then set administrate permission commands to program the entries of the user's behavior, and gestures to provide the desired operations.

Figure 5B:
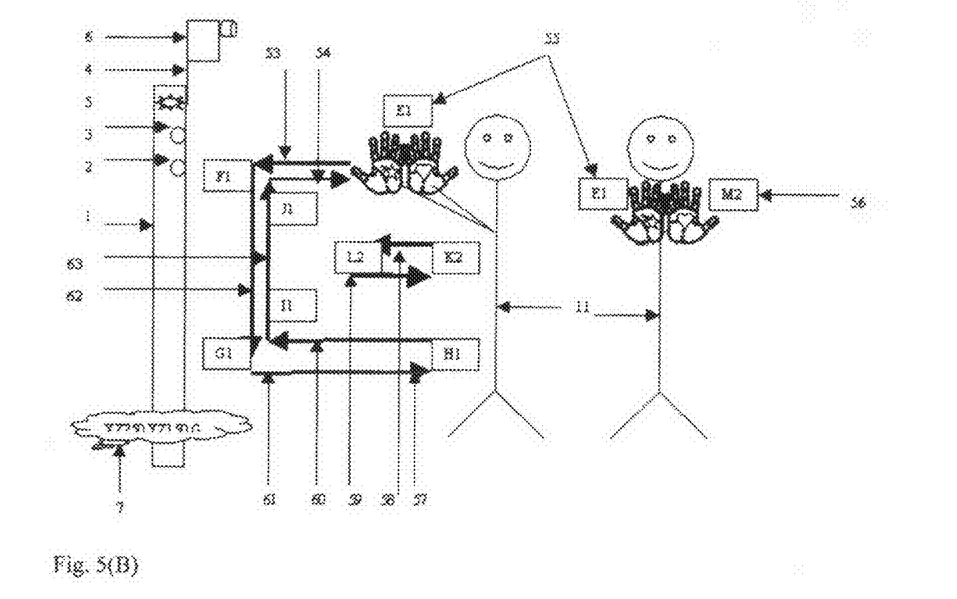
FIG. 5(B) is a schematic diagram showing Part 2 of using the initializing sequence steps in the input for training the input device for tracking objects.

FIG. 5(B) illustrates the Part 2 operation for initializing the steps of a sequence for training the vision tracking different objects in which each individual object has a specific shape, size, colors, wireless sensors or LED lights embedded therein, or carrying thereon laser beam lights. The user would first move the objects in the direction within the view of the device's video cameras 6, web camera 2 and web camera 3, and then employs a 2 steps tracking training operation as shown in the illustrated example with the objects attached to the user's hands. In the first step, the user would start the operation by moving the objects from position E1 following the direction 55 and then moving towards the device1 in the direction 53 to arrive at a new location F1 with the objects still facing the device 1. The objects are then moved downwards from location F1 following the direction 62 to arrive at position G1 from which they are further moved backwards in the direction 61 to arrive at a position 57 of location H1. The objects are then moved from H1 following the direction 60 to arrive at location I1 from which they are moved upwards following the direction 63 to arrive at location J1. Finally, they are moved in the upward direction 54 to return to the starting position E1. In the second step, the user would move the objects from position K2 which represents the high traffic area in the user working space zones. The objects would then be moved in the direction 58 to arrive at position L2 from which they are moved, with them still facing the device 1, in the direction 59 to return to the starting position K2. The user would repeat the operation of moving the objects in the high traffic working space zone from position K2 to position L2 several times in a straight line direction as well as in a circular direction. After having moved back to the starting position E1, the objects will be retained in the position without moving for several seconds.

In the two steps training operation, the logical vision tracking program residing in the device 1 would compare the video frames obtained in the two steps in series. The program will then determine from the comparison of these frames the unmoving background image signal and the unmoving background image signal would then be filtered out. Thus, the logical vision tracking program can differentiate the background image signal and the objects' signals to determine the selected signals on which to focus its tracking operation. Alternatively, the logical vision tracking program 7 may be manually programmed by hard coding for tracking only on the special objects matching input object definition set by the coding. For example, when the logical vision tracking program is programmed to track only for a yellow sharp pen, it will do so and will not only know where the pen is moving but will also follow the direction of movement of the pen.

Figure 6:
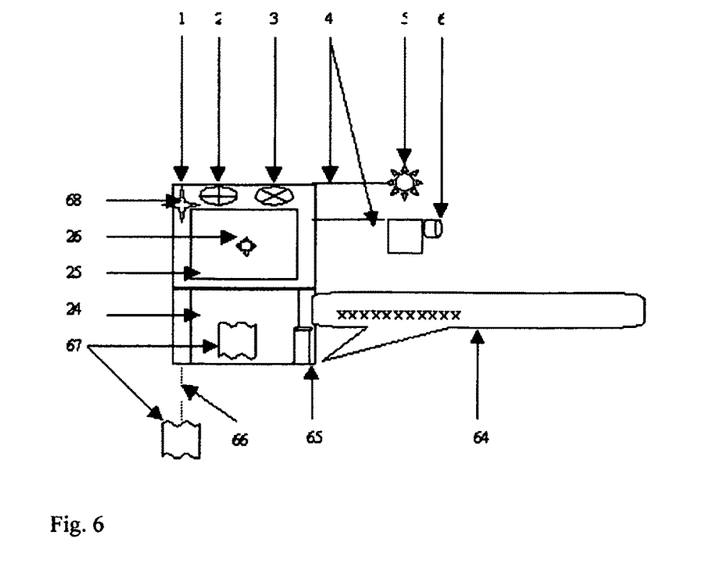
FIG. 6 is a schematic diagram showing the device of the present invention equipped with a microphone, sound sensors, speech recognition software program for listening to the user's voice commands, and a speaker for reading out text, article and to communicate with the user. Additionally, the input device is also equipped with a motor vibrate silent-reading module.

FIG. 6 shows the embodiment in which the device of the present invention is equipped with a microphone 68 to serve as sound sensors to receive the user's voice commands. Various types of vision sensors 5 and a common speech recognition software program 65 may be provided for recognizing the user's voice commands. A speaker 64 is included to provide a voice feedback to indicate and confirm whether the intended data, key or command has been entered correctly by the user. Additionally, the device of the present invention is also equipped with a motor vibrate silent reading module 67 to facilitate it to be operated by a deaf or blind person, or a person with speech disability.

Figure 7:
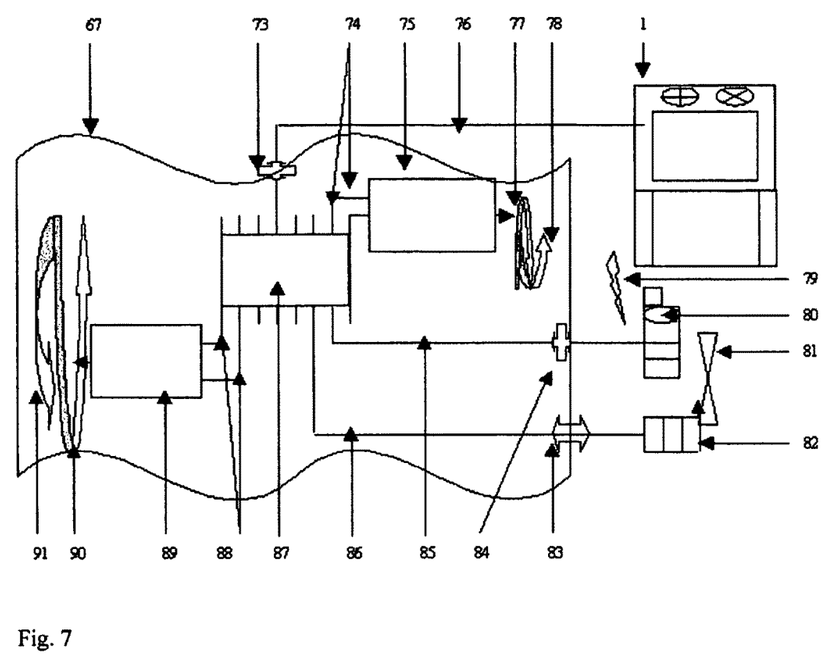
FIG. 7 is a schematic diagram showing the operation of the components of the motor vibrate silent-reading module to generate Morse code text vibrate signals for the user to read articles from the input device in silence.

FIG. 7 illustrates the present invention in which the device 1 is provided with a motor vibrate silent reading module 67. The reading module contains two motors 75 and 89 which may be servo motors, step motors or DC motors. These motors are controlled by a micro controller 87. The module 67 may be wirelessly connected to the device 1 by a smart phone adaptor 84 having a smart phone 80, or by a wi-fi adaptor having a wi-fi receiver 82, or alternatively connected by directly wired thereto by using a serial port adaptor 73. The smart phone adaptor 84 connection is shown by the circle line 85, while the wi-fi adaptor connection is shown by the circle line 86. The wireless connection may be provided with various protocols such as Bluetooth 79, wi-fi 802.11 shown as 81, cell phone channels, or alternatively by an Ethernet wire connection. For example, the device 1 may transmit commands to the smart phone 80 to operate the micro control 87 for spinning its motors 75 and 89 in the selected directions. The motor 75 has a small seashell shape spring coil 77 which can operate to generate a small vibration or a short vibration signal. The motor 89 also has a larger seashell shape spring coil 90 which can operate to generate a larger vibration or a long vibration signal. The motor 75 is connected to the micro controller 87 through the signal circle line 74 for spinning in the direction 78, while the motor 89 is connected to the micro controller 87 through the signal circle line 88 for spinning in the direction 91. The device 1 has a Morse code or standard text coding program which can convert the text into the long and short signals into Morse code. The device 1 sends commands to the smart phone 80 to operate the micro controller 87 to operate the long vibration generation motor 89 or the short vibration generation motor 75 to generate, in turn, the series of long and short vibration signals of the Morse code. The reading module converts the Morse code into text sentences or words thus the user can read in silence the text or words transmitted from the device 1. A simple vibrate signal generation may be obtained by attaching a stick in the horizontal position to each motor so that the turning of the motors would cause the stick to contact the user in a back and forth series motion to represent the long and short signals. Alternatively, the reading module can divide each motor into two sections with a half side vibrate surface of the motor 75 representing a short signal, and the other half side vibration surface of the motor 89 representing a long signal. Therefore, with the reading module, the user is able to read the text or words transmitted from the device in silence.

Figure 8:
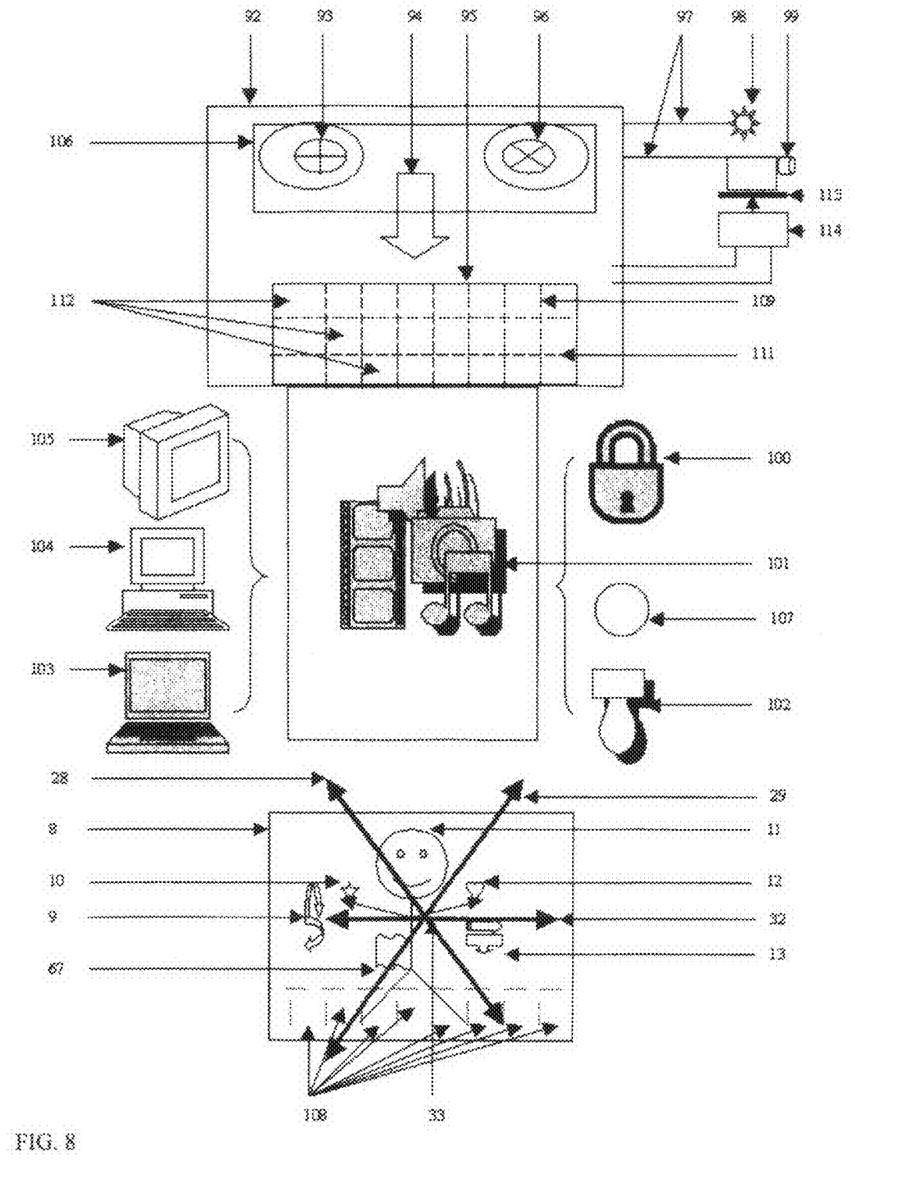
FIG. 8 is a schematic diagram showing the overall view of incorporating the input device of the present system in a home. The input device has a trainable computer vision to recognize the user's hand gesture commands with specific symbol, shape, color, and/or optionally embedded wireless sensors for reliably vision tracking to provide easy remote control of all electrical appliances in the home.

FIG. 8 shows a home-based system having the device according to the present invention incorporated therein. The interface input device 92 in this embodiment is equipped with a video web camera 93 for X, Y dimensions tracking reading; a video web camera 96 for Z dimension tracking reading. It is also equipped with a plurality of various types of sensors 98 such as a light sensor, touch sensor, sonar sensor, rotation sensor, video visual vision camera sensor, temperature sensor, sound sensor, ultrasound sensor, infrared light sensor, motor speed sensor, pressure sensor, angle degree sensor, etc. Direct wire connection or wireless connection may be employed to provide the connection means 97 between the sensors 98 and the video cameras 99 to the device 92. When the device 92 detects the presence of the user by using the sensor 98, it will use the video web camera to measure the user's height and width, and will automatically calibrate the working space 8. The device 92 will then project the dimensions axis G-point 33 that represents the center point of the whole working space 8 relative to the 3D level user working space 8 having X dimension surface 32, Y dimension surface 29, and Z dimension surface 28. The user's hand gesture in XYZ space positions will be based on their relative respective distances from the G-point 33. For example, with the start point located at X0, Y0, and Z0, the new coordinates will be either a plus or minus value as the distance between it and the G-point 33 changes. The home base system is operated by the logical vision sensor software program 106 for processing the input data from the device to constantly watch for the user's hand gestures so as to obtain the X, Y dimension action 111, and the Z dimension action 109 and to generate a virtual command input data and operating command. The logical vision sensor software program 106 will also instruct the device to track and lock on an object's shape, size, colors, embedded wireless sensors and LED lights, laser beam lights. As shown, the user has a star shape object of vision tracking symbol 10 worn on the right hand, and additionally also has a heart shape object of vision tracking symbol 12 worn on the left hand. The user would move the right hand gesture's X, Y dimension actions on a specific puzzle cell position 108 to select the desired text or command, and would use the left hand gesture for Z dimension action by pushing the left hand out towards the device to confirm the selected action. The device would accept the user's virtual gesture command of puzzle cell position coordinates in the virtual working space zone 8. A puzzle cell position coordinates translate program 94 in the device 92 will automatically translate the received X, Y, and Z coordinates of the user's hand gesture actions in the puzzle cell position in the working space 8 into virtual space cell position of text and command according to a text and command conversion response action map programming list 95. It will then calibrate the response action cells with the map action X cell lines 111, and map action Y cell lines 109 to establish the puzzle cell position definition response actions 112. Thus, the system is able to calibrate the user's hand gestures of virtual space actions to convert them into selected text and command to execute meaningful operations in the computer 104, or appliances such as a television set 105, a lighting device 102, a robotic vacuum device, or an electronic door lock 100. Therefore, the device may be incorporated into a home appliance automation system 101 for controlling all appliances in a home. A plurality of video vision image sensor cameras 99 are provided in the device 92 for watching and tracking the actions of the object's XYZ dimensions to send data to the device's logical vision sensor software program 106 the XYZ dimension action of each hand of the user. The user places one hand on the puzzle cell position and points it towards the device 92 to confirm the selected text or command. The user can carry a motor vibrate silent reading module for receiving long and short vibrate Morse code or standard text coding for reading articles from a computer.

A plurality of video cameras 6 and various types of sensors 98 may be installed in each room of a home to provide a video camera network and sensors network. The motor 114 of the video camera 6 may be mounted on a movable holder113. The motor 114 is controlled by the device 92 such that the vision sensor of the device 92 will rotate the video camera 6 to track and follow the user. The user may wear special objects to enhance the precision of the tracking operation. Thus, the motor 114 will be activated to rotate the video camera 6 to aim at the user 11 and the special objects constantly to wait for any command from the user 11. Accordingly, the home type system can increase in a dynamic way the operation of a computer and home appliances. It can also provide convenient assistance to a physically handicapped person to operate a computer and home appliances with ease.

The intelligent device of the present invention may be constructed with the following exemplary hardware and software:

1. A computer operating on Windows XP with SP2;
2. Web camera having direct captures driver, window driver, or support video for window capture;
3. Microsoft Robotics Studio software as the logical vision tracking software program;
4. .Net Frameworks 3.0 software as the data processing software for updating the XYZ position data;
5. Microsoft Internet Explorer and Web Browser;
6. A web camera Interface.minifest.xml file created by writing a logical vision studio, which can be run to create a web camera service that operates on the computer as an automatic vision sensing device. The logical vision tracking software program can provide coding for more advance features such as for tracking a special object by its color defined in RBG values, size, shapes such as circle etc., and other types of data from a video frame;
7. A computer system trainable as a vision sensing unit for tracking special objects;
8. Logical vision tracking program having programming coding of Update Frame, Query Frame, Time Stamp, Length, Data of coding to trigger the latest video frame and store video frame, and to compare the video frames to extract the XYZ dimension surface direction values of an object being tracked;
9. Software program and script capable of updating the XYZ position values relative the distance from an initial vision G-point;
10. A position translate program for matching the new XYZ position values with defined response actions such as Mouse Cursor Up, or Down, or clicks, on the specific mapping position that is assigned to the command or function.
11. A position translate program for executing automatically the computer operation of the commands or for entering alphabets or characters commanded by the user's hand gestures;
12. Command for operation completed, vision watching, and waiting for further action from the user;
13. If the user commands the device to read an article with a silent reading function, the device can remotely control a motor vibrate silent reading module to transmit the Morse coding for each word and sentence of the article wirelessly to a smart phone with Bluetooth protocol. The smart phone is adapted on the reading module to operate the micro controller to spin the long and short motors to generate the long and short vibrations for creating the Morse code so that the user can silent read the article from the computer.
14. A speaker in the device is operative by a speech recognition software program for providing a voice feedback to the user and to confirm commands entered by the user. A microphone and sound sensors are provided in the device for the user to communicate with the device by voice.
15. For total tracking vision especially for a home base operation, a video camera is installed in each room of the home. The video camera is mounted on a motorized base which may be controlled by vision sensors to follow a moving user or special object in the room.
16. A variety of types of sensors such as a light sensor, touch sensor, sonar sensor, rotation sensor, video visual camera sensor, temperature sensor, sound sensor, ultrasound sensor, infrared sensor, motor speed sensor, pressure sensor, angle degree sensor, etc., may be installed to provide various selected types of sensor networks and for sensing reading signals convertible into XML or other signal formats which can be used by the device to provide advanced intelligent operations. The above exemplary embodiment is based on the Microsoft Windows technology. Other well known operating system such as Linux may also be employed to create the sensing and tracking device of the present invention. HP image sensor video camera, and Windows CE embedded software etc., may also be used. The programming language can be other types such as $C^{++}$, Java, and visual programming language etc. There are also other suitable vision tracking software and vision image camera sensor tools which may be provided by other commercial companies. The above examples are the alternative solutions for creating the intelligent sensing and tracking device of the present invention.

The device of the present invention may be built in the form of a single microchip. The means for translating space gesture actions and to correlate with software mapping key listing to convert into data and command for operating the computer may also be built or embedded into the microchip, or a processor, or a video processor that contains the following four sections of intelligent virtual space commands software:

1. Logical vision tracking program;
2. X, Y, and Z surface direction following program;
3. X, Y, and Z dimension value program; and
4. X, Y and Z position translate program.

The processor contains three working space calibrate alignment arrangement standards for mouse, keyboard, and hand-sign language patterns to initialize automatically the virtual working space into virtual space mouse zone, virtual space keyboard zone, and hand sign language zone for the computer. Various machines can use the computer vision method to watch for user's gesture actions performed in the above three zones and mapping the received gestures actions into position value for practical computer commands. The device of the present invention may be installed on any computer, machine or appliance in a home, and it is able to connect the video vision camera sensor operating in Windows XP, CE embedded, or Linux etc., operating software program to provide the virtual space mouse and space keyboard on such computer or machine.

I claim:

1. A computer program product comprising a non-transitory computer usable medium having control logic stored therein for causing an input device to track and transform hand gestures into input commands for controlling a computer or electrically operated machine, said control logic comprising:
   First computer readable program code for processing X, Y and Z coordinates dimension data by recording a width and a height of a user to determine the X and Y coordinates and a distance of the user to determine the Z coordinates
   Second computer readable program code for providing input data and commands for executing various operations of computer or electrically operated machine;
   Third computer readable program code for establishing a virtual working area by the user's width and height, wherein a center point of the virtual working area relative to the user is established;
   Fourth computer readable program code for establishing a virtual space keyboard zone, wherein keys in the virtual space keyboard zone are positioned relative to the center point of the virtual working area; and
   Fifth computer readable program code for establishing a virtual hand-signal language zone, wherein X, Y, Z finger coordinates are established relative to the center point of the virtual working area to establish hand gestures.

2. The non-transitory computer readable program product of claim 1 further comprising:
   eighth computer readable program code for creating puzzle cell positions in each of said virtual space mouse zone, virtual space keyboard zone, and virtual hand sign language zone; and
   ninth computer readable program code for correlating said puzzle cell positions with a mapping list to determine a command to be executed in said computer or electrically operated machine by said hand gestures of said user.

3. The non-transitory computer readable program product of claim 2 wherein said mapping list is a listing of commands for executing various operations of said computer or electrically operated machine.

4. The non-transitory computer readable program product of claim 2 wherein said commands are operation commands of an operating computer connected to said input device and said logic vision tracking program provides to said operating computer cursor operations including Up, Down, Left, Right, mouse clicks, typing of a selected text, reading of hand sign language, and writing of a symbol character, and drawing of a picture in said operating computer.

5. The non-transitory computer readable program product of claim 1 further comprising:
   eighth computer readable program code for tracking said user located in said space keyboard zone;
   ninth computer readable program code for defining a plurality of puzzle cell positions in said space keyboard zone; and
   tenth computer readable program code for receiving changes in coordinates data made by said hand gestures of said user to correlate with said mapping list of commands for actuating a selected computer operation.

6. The non-transitory computer readable program product of claim 1 further comprising:
   eighth computer readable program code for translating hand gestures made by said user located in said hand-sign language zone; and
   ninth computer readable program code for correlating said gestures with said listing of hand sign language gesture patterns to provide a selected command for operating said computer or electrically operated machine.

7. The non-transitory computer readable program product of claim 1 further comprising eighth computer readable program code for translating hand actions of said user for writing Chinese characters and drawing pictures in a computer.

8. The non-transitory computer readable program product of claim 1 further comprising eighth computer readable program code for tracking shape, symbols and colors of a specific object located at said virtual working space.

9. The non-transitory computer readable program product of claim 2 wherein said puzzle cell positions are customizable to represent a selected key arrangement operative for executing command operation of said computer or electrically operated machine.

10. The non-transitory computer readable program product of claim 1 further comprising eighth computer readable program code for receiving voice commands from said user.

11. The non-transitory computer readable program product of claim 1 further comprising eighth computer readable program code for initializing sequence steps of tracking small movements of fingers in said user's hand gestures.

12. The non-transitory computer readable program product of claim 11 further comprising ninth computer readable program code for providing dimensional measurements of said virtual working space.

13. The non-transitory computer readable program product of claim 1 further comprising:
   eighth computer readable program code for measuring said user's height and width; and
   ninth computer readable program code for automatically calibrating the distance from said user to said virtual working space to establish said virtual space mouse zone, virtual space keyboard zone, and virtual hand sign language zone.

14. The non-transitory computer readable program product of claim 13 further comprising tenth computer readable program code for enabling said input device to operate with all three zones simultaneously.

15. The non-transitory computer readable program product of claim 14 further comprising eleventh computer readable program code for tracking changing X surface direction, Y surface direction, and Z surface direction of said user's hand gestures in establishing a virtual space XYZ coordinate value relative to the distance of movement of said hand gestures from a vision G-point center designated in said virtual working space.

16. The non-transitory computer readable program product of claim 15 further comprising twelfth computer readable program code for converting said XYZ coordinate value into a selected command for operating said computer or electrically operated machine by said hand gestures of the user.

17. The non-transitory computer readable program product of claim 15 further comprising:
   twelfth computer readable program code for determining physical keyboard alignment angles relative to said G-point; and thirteenth computer readable program code for establishing puzzle cell positions in said virtual space keyboard zone to form a virtual space keyboard.

18. The non-transitory computer readable program product of claim 15 further comprising:
  twelfth computer readable program code for confirming change in Z surface direction by adding a −1 value to the Z dimension value when said user makes a gesture by placing a hand at a puzzle cell position to make a key selection of an H key in said virtual space keyboard; and
  thirteenth computer readable program code for adding a value of 1 to the X dimension value to designate distances of said H key from said G-point.

19. The non-transitory computer readable program product of claim 18 further comprising:
  fourteenth computer readable program code for translating the change in values of said X dimension and Z dimension to compare with key locations in said keyboard mapping list; and
  fifteenth computer readable program code for executing said key selection by displaying an H character on a monitor of said computer.

20. The non-transitory computer readable program product of claim 19 further comprising sixteenth computer readable program code for tracking and confirming XYZ position coordinate values relative to the distance from said G-point of a finger in each hand of said user for determining desired operations made by standard hand sign language gestures.

21. The non-transitory computer readable program product of claim 20 further comprising seventeenth computer readable program code for matching series of tracking values representing specific hand sign words for establishing word selections made with hand sign language gestures by said user.

22. The non-transitory computer readable program product of claim 21 further comprising:
  eighteenth computer readable program code for recognizing movement of a sharp point of a pen wherein said user holding said pen and pointing said sharp point towards said robotic input device is able to make movement of said sharp point for writing a word, character, and picture drawing selectively; and
  nineteenth computer readable program code for translating the XYZ position value of the movement of said sharp point in providing input data for drawing said word, character, and picture respectively in said computer.

23. The non-transitory computer readable program product of claim 1 further comprising eighth computer readable program code for comparing sequential steps of hand gestures of said user with a memory listing of acceptable sequential steps of hand gestures to determine whether said hand gestures are performed by an acceptable user.

24. The non-transitory computer readable program product of claim 23 further comprising ninth computer readable program code for waking said input device from a sleeping mode prior to accepting further hand gestures from said user to execute operations of said computer or electrically operated machine.

25. The non-transitory computer readable program product of claim 24 further comprising tenth computer readable program code for processing and executing tracking inputs in the training of said input device when tracking a special object, said inputs having two steps wherein in a first step said user moves a hand in said working space with said special object having a particular shape, size, color, embedded wireless sensors, LED lights, and laser beam lights selectively adapted on said hand, and in a second step said user moves said special object in a high traffic area of said working space zone, said logical vision tracking program being operative to compare series of video frames obtained in said two steps to determine said tracking operation of said special object.

26. The non-transitory computer readable program product of claim 25 further comprising eleventh computer readable program code for enabling the hard code manual programming by said user for tracking said special object, in said hard coding manual programming said user setting tracking codes of said special object having said shape, size, color, embedded wireless sensors, LED lights, and laser beam light selectively, said logical vision tracking program being operative by said tracking codes for tracking an object matching said tracking codes.

27. The non-transitory computer readable program product of claim 1 further comprising:
  eighth computer readable program code for converting text from a computer into long and short signals according to standard Morse code; and
  ninth computer readable program code for enabling the transmission of said signals to a smart phone to operate a micro controller for operating a long vibrate motor and a short vibrate motor, a reading module being coupled to said micro controller and receiving long and short signals from said long vibrate motor and said short vibrate motor respectively to generate long and short Morse code signals representing article text for the silent reading of said article text by said user.

28. The non-transitory computer readable program product of claim 1 further comprising:
  eighth computer readable program code for receiving voice commands from said user;
  ninth computer readable program code for reading out text;
  tenth computer readable program code for carrying out voice communication with said user; and
  eleventh computer readable program code for providing silent reading of text and article in Morse code represented by hand gestures by said user.

29. A system for tracking and transforming a user's hand gestures into input commands for controlling a computer or electrically operated machine, comprising,
  An input device;
  At least one video vision camera, in operable communication with said input device;
  At least one vision sensor, in operable communication with said input device;
  At least one web camera, in operable communication with said input device, wherein said web at least one web camera, along with said at least one vision sensor, are configured to automatically scan a selected work space for tracking an object;
  An automatic motor in operable communication with said video vision camera wherein said motor is controlled by said input device to enable said video vision camera to track and follow said user continuously;
  A central control computer, in operable communication with said input device, said video vision cameras and vision sensors;
  Computer readable program code for processing X, Y and Z coordinates dimension readings by recording a width and a height of a user to determine the X and Y coordinates and a distance of the user to determine the Z coordinates, wherein a center point is determined based on the X, Y, and Z coordinates and the hand gestures is based on distances between the X, Y, and Z coordinates and the center point;

- A microphone, in operable communication with said input device;
- At least one sound sensor in operable communication with said input device.

30. The system according to claim 29 further comprising wireless sensors attached to said object to enhance tracking of said object to facilitate operation of said computer or electrically operated machine by a person having physical disabilities.

31. The system according to claim 29 further comprising a wood stick mounted on said input device wherein said wood stick is configured to execute command operations in response to hand gestures from said user.

32. The system according to claim 29 further comprising a reading module comprising:
   - two sections of vibration surfaces, wherein said surfaces are configured to distinguish between long and short signal codes for reading a text in Morse code; and
   - two seashell shape spring coils attached on two spin motors, wherein said coils are configured to generate said long and short signal codes to facilitate silent reading of Morse code and standard text coding for a blind and deaf person.

33. The system according to claim 29 wherein said input device is configured to be incorporated into an electrical unit to facilitate operation of said electrical unit by using said user's hand gestures.

34. The system according to claim 29 further comprising:
   - A long vibrate motor, in operable communication with said reading module, wherein said long vibrate motor is configured to receive long signals to generate long Morse code signals representing article text for silent reading of said text by said user; and
   - A short vibrate motor, in operable communication with said reading module, wherein said short vibrate module is configured to receive short signals to generate short Morse code signals representing article text for silent reading of said text by said user.

35. The system according to claim 34 further comprising a stick attached to said long vibrate motor and said short vibrate motor respectively whereby said stick moves back and forth from a horizontal position to contact said user wherein each said contact represents a Morse code signal.

36. The system according to claim 29 wherein said reading module is divided into two sections with a left half side vibrate surface representing a short signal, and a right half side vibrate surface representing a long signal.

37. The system according to claim 29 further comprising:
   - a video web camera, in operable communication with said input device and configured to track X and Y dimension readings;
   - a second video web camera, in operable communication with said input device and configured to track Z dimension readings; and
   - a plurality of various types of sensors within said input device, said sensors being in operable communication with said first video web camera and said second video web camera.

38. The system according to claim 29 further comprising speaker in operable communication with said input device, wherein said speaker is configured to operative provide voice feedback to said user, provide text speech conversation and read out text for said user.

39. The system according to claim 29, wherein said microphone and sound sensor are both configured to receive voice commands from said user.

\* \* \* \* \*